(12) United States Patent
Ronnau et al.

(10) Patent No.: US 12,045,104 B2
(45) Date of Patent: Jul. 23, 2024

(54) PROCESSOR THERMAL METRIC

(71) Applicant: Hewlett-Packard Development Company, L.P., Spring, TX (US)

(72) Inventors: Maikel Maciel Ronnau, Porto Alegre (BR); Matheus Eichelberger, Porto Alegre (BR); Franco Vieira e Souza, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 201 days.

(21) Appl. No.: 17/418,277

(22) PCT Filed: Jul. 19, 2019

(86) PCT No.: PCT/US2019/042673
§ 371 (c)(1),
(2) Date: Jun. 25, 2021

(87) PCT Pub. No.: WO2021/015721
PCT Pub. Date: Jan. 28, 2021

(65) Prior Publication Data
US 2022/0129053 A1    Apr. 28, 2022

(51) Int. Cl.
*G01K 1/024* (2021.01)
*G01K 3/00* (2006.01)
*G06F 1/20* (2006.01)

(52) U.S. Cl.
CPC ............. *G06F 1/206* (2013.01); *G01K 1/024* (2013.01); *G01K 3/005* (2013.01)

(58) Field of Classification Search
CPC ........ G01K 1/024; G01K 3/005; G01K 13/00; G06F 1/206; G06F 1/3228; G06F 1/324; G06F 1/3243; G06F 9/4893; G06F 1/3296
See application file for complete search history.

(56) References Cited

U.S. PATENT DOCUMENTS

| | | |
|---|---|---|
| 2002/0101715 A1 | 8/2002 | OSecky et al. |
| 2004/0268166 A1 | 12/2004 | Farkas et al. |
| 2007/0067136 A1 | 3/2007 | Conroy et al. |
| 2008/0040067 A1 | 2/2008 | Bashor et al. |
| 2010/0030395 A1 | 2/2010 | Shimotono et al. |
| 2010/0315223 A1 | 12/2010 | Gross et al. |
| 2012/0216200 A1 | 8/2012 | Vaidyanathan et al. |
| 2014/0121854 A1 | 5/2014 | Conroy et al. |
| 2015/0046685 A1 | 2/2015 | Park et al. |
| 2015/0241885 A1* | 8/2015 | Shelnutt ............ G06F 1/206 700/299 |

(Continued)

*Primary Examiner* — Matthew G Marini
*Assistant Examiner* — Leo T Hinze
(74) *Attorney, Agent, or Firm* — Quarles & Brady LLP

(57) ABSTRACT

In an example implementation according to aspects of the present disclosure, a computing device and computer readable media to receive a temperature, operating speed, maximum operating speed, and utilization rate of a processor. A processor performance metric may be calculated based on the operating speed, maximum operating speed, and utilization rate. The processor performance metric and temperature may be used to retrieve a value in a thermal mapping. The value in the thermal mapping may be compared against a threshold to determine if a processor thermal metric event has occurred. An indication to the user may be presented in the event of a thermal metric event.

12 Claims, 4 Drawing Sheets

(56) References Cited

U.S. PATENT DOCUMENTS

2016/0274629 A1    9/2016   Lovicott et al.
2018/0373276 A1   12/2018  Sondur et al.
2019/0043737 A1    2/2019   Hutton

* cited by examiner

PROCESSOR THERMAL METRIC

BACKGROUND

Computing systems utilize processing units that produce heat. The produced heat, if not properly removed from the system may cause damage to the processing units as well as other components in the system.

DETAILED DESCRIPTION

Computing systems provide cooling systems to remove heat from the system. Cooling systems may provide heat sinks, fans, thermoelectric cooling elements, and liquid cooling loops. However, the computing systems do not have feedback systems to evaluate whether the cooling system is operating properly, and thereby keeping the computing system operating at a high level. Described herein, is a system for detecting a processor thermal metric event.

In one example, a system may include a temperature sensor and a first processor. The first processor may be configured to receive a temperature corresponding to the temperature of the second processor. The first processor may receive a utilization rate corresponding to the utilization rate of the second processor. The first processor may receive an operating speed of the second processor. The first processor may receive a maximum operating speed of the second processor. The first processor may determine a processor performance metric based on the received measurements. The first processor may retrieve a value from thermal map based on the processor performance metric and the temperature. The first processor may trigger a user event based on the retrieved value.

Figure 1A:
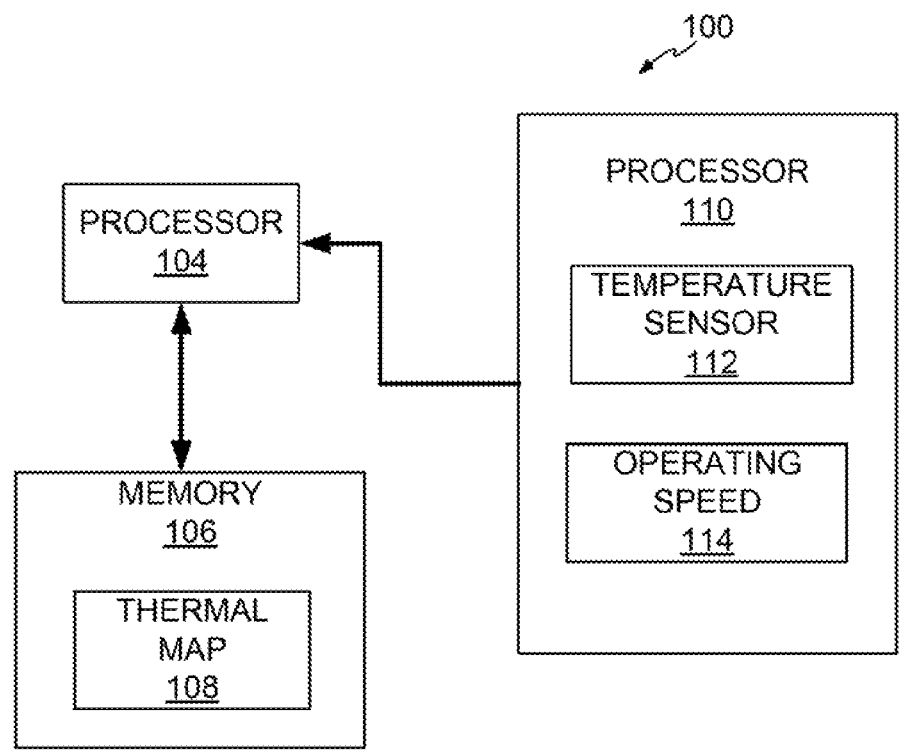
FIG. 1A illustrates a system for handling a processor thermal metrics, according to an example.

FIG. 1A illustrates a system 100 for handling processor thermal metrics, according to an example. The system 100 may include a first processor 104, a memory 106 and a thermal map 108.

The first processor 104 provides support for processing data in relation to the second processor 110. The first processor 104 may be implemented as a generalized compute processor such as a central processing unit (CPU) of a personal computer. The first processor 104 may operate in a cloud server environment and may be implemented with a many core server CPU in a rack mounted environment. Additionally, the first processor 104 may be a collection of distributed CPUs with an abstraction software layer, or a virtualized CPU.

The first processor 104 may be communicatively coupled to a memory 106. The memory 106 may include dynamic random-access memory (DRAM) implementation. In other implementations, the memory 106 may include but not limited to storage devices including hard disk drive, solid state drives, and optical storage. The memory 106 may be implemented as a logical database on the physical storage medium. The coupling between the memory 106 and the first processor 104 may be implemented in direct electrical interconnects in a stand-alone personal computer implementation. In another implementation, the coupling between the memory 106 and the first processor 104 may include a network connection to a remote database.

The memory 106 may store a thermal map 108. The thermal map 108 may be a logical arrangement of values in memory corresponding to a behavior pattern of a processor. The thermal map 108 is described in detail in reference to FIG. 1B. The thermal map 108 may be a predetermined operating temperature specification created through historical values collected through benchmarking and test.

A second processor 110 may be the subject of analysis of the first processor 104. The second processor 110 may be a physical processor such as a general-purpose processor, such as a CPU, or in another implementation, a special purpose processor such as graphics processing unit (GPU). Any processor may be utilized as the second processor 110, as long as a temperature sensor 112 provides a sampling and the operating speed 114 is obtainable. The second processor 110 may include a temperature sensor 112 to provide measurements of temperature associated with the second processor 110. The temperature sensor 112 may be integrated directly into the second processor 110, or in another implementation, the temperature sensor 112 may be physically placed adjoining a surface of the second processor 110. In an implementation where the temperature sensor 112 is integrated, more than one temperature sensor 112 may be integrated to the second processor 110 to differentiate temperature reading from various areas of the second processor 110. The temperature sensor 112 may include an interface allowing the first processor 104 to query and receive readings or samples. The interface may include a network connection, thereby connecting the first processor 104 and the second processor 110 when physically located at distant locations. In another implementations, the interface may be a software interface for local system utilization. For example, the first processor 104 may be a host CPU for a personal computer, and the second processor 110 may be a GPU for a personal computer. The temperature sensor 112 may be accessed utilizing an application programming interface (API) provided by the manufacturer of the second processor 110.

An operating speed 114 may correspond to the second processor 110. The operating speed 114 may correspond to a clock speed the second processor 110 is currently operating. In modern processors, operating speed 114 may vary by processing load, Operating speeds 114 may be lowered when processing loads are light and may be increased when processing loads are heavy. In another implementation, operating speed 114 may vary based on thermal loading. In a throttling example, if the second processor 110 experiences high temperature levels, the operating speed 114 may be lowered. Conversely, if the second processor 110 experiences low temperature levels, the operating speed 114 may be increased. The operating speed 114 may be queried from the second processor 110 utilizing an API provided.

Figure 1B:
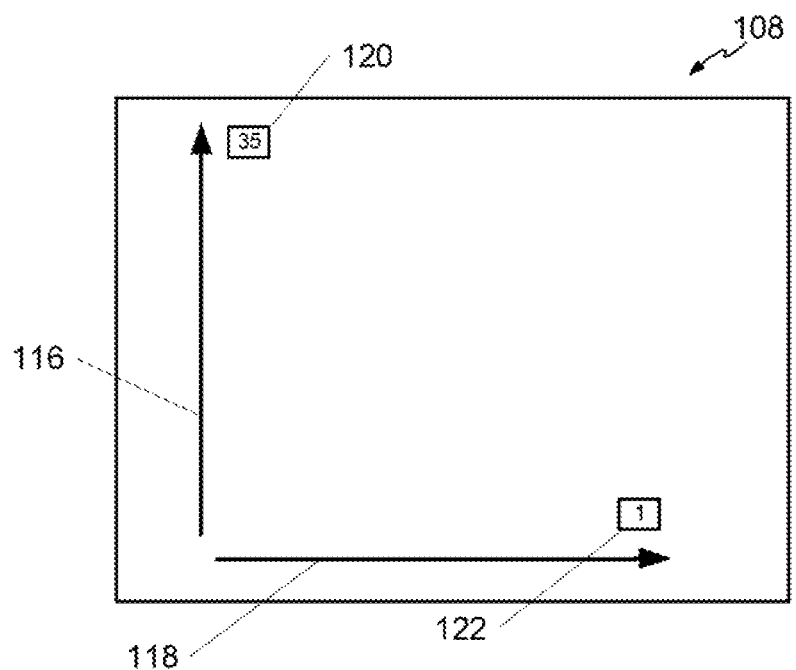
FIG. 1B illustrates a thermal mapping, according to an example.

FIG. 1B illustrates a thermal mapping, according to an example. A thermal map 108 is a predetermined mapping of temperature vs processor performance metric (PPM) for a particular processor. The thermal map 108 may be represented as a two-dimensional chart. The thermal map may include temperature on one axis (x-axis 118) of the chart, and processor performance metric on the other axis (y-axis 116) of the chart. The granularity of the x-axis 118 may vary from processor to processor. Each x, y coordinate on the chart may correspond to a value indicative of PPM vs temperature. As illustrated in FIG. 1B, the thermal mapping values may be lower on the bottom right side of the thermal map 108, and higher on the upper left side of the thermal map 108. A high performing value 120, corresponding to a high performing processor may be represented in the top left of the thermal map 108. A low performing value 122 may be represented in the bottom right of the thermal map 108. It should be appreciated that the thermal map 108 is a graphical representation of a digital data structure stored in memory 106. The thermal map 108 may include an interface to index into the thermal map 108 and retrieve a value at a given (x,y) cartesian coordinate pair. The thermal map 108 may correspond to a given processor type. As there are many processor types from different manufactures, there may be many thermal maps stored in memory 106. The thermal map 108 may be provided by a manufacturer of a processor, or in another implementation, determined through benchmarking and trial data.

Figure 2:
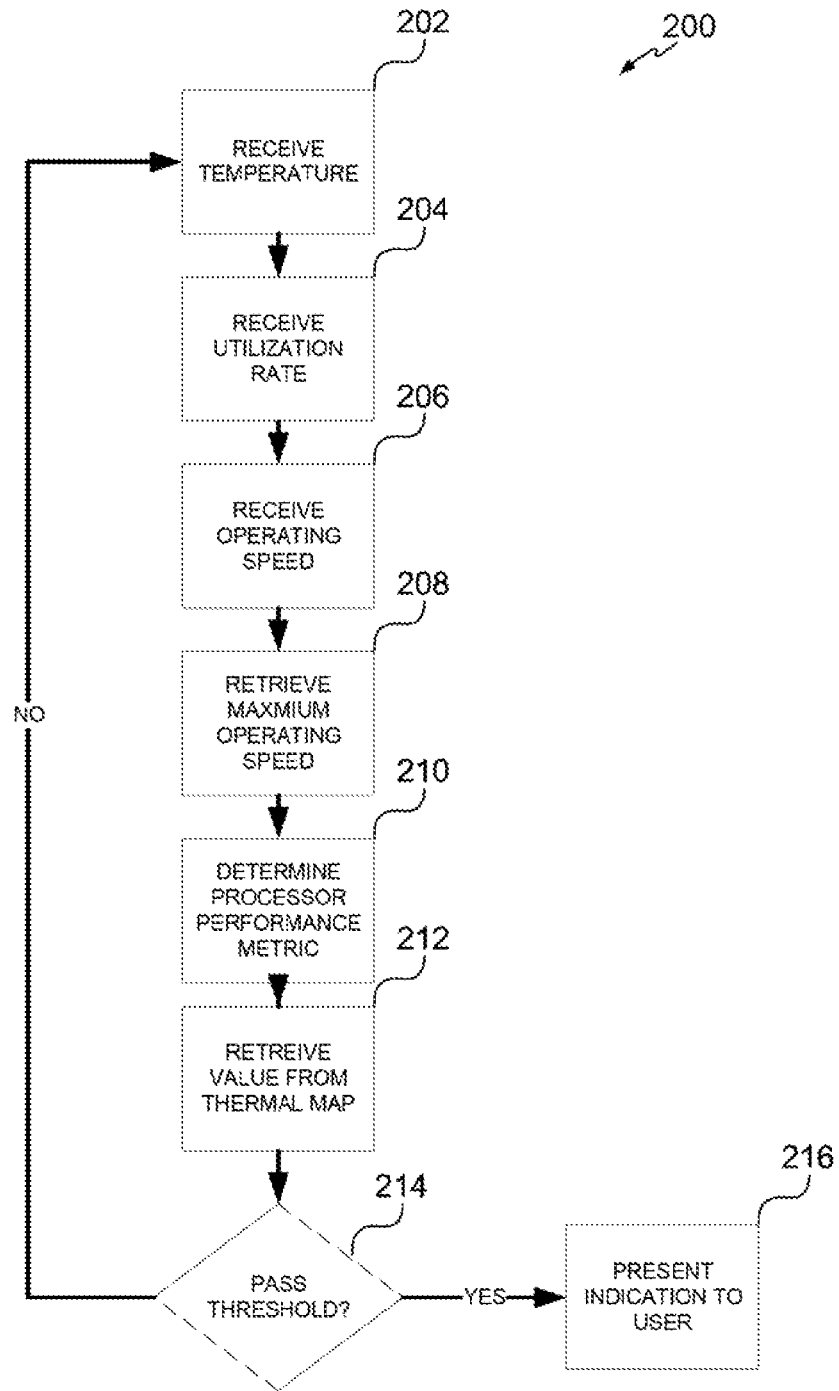
FIG. 2 is a flow diagram illustrating the processing of processor thermal metrics, according to an example.

FIG. 2 is a flow diagram 200 illustrating the processing of processor thermal metrics, according to an example.

At 202, the first processor receives a temperature. The temperature may include a sampling from the temperature sensor reference in FIG. 1A. The temperature may be polled from the second processor 110, queried, or provided in an event driven notification system. The first processor stores the temperature as an input into the thermal map.

At 204, the first processor receives a utilization rate. The utilization rate may include a computer system calculation of utilization of the second processor. In one implementation, the utilization rate may be represented as a percentage of processing time. The received utilization rate may correspond to the received temperature at the same time.

At 206, the first processor receives an operating speed. As mentioned in reference to FIG. 1A, the operating speed is received by the first processor. The operating speed of the second processor may be stored in the memory 106 for the creation of a processor performance metric. In another implementation the operating speed may be stored in a register or cache of the first processor.

At 208, the first processor receives a maximum operating speed. The maximum operating speed corresponds to the maximum speed the processor can operate at under ideal conditions (temperature and load). The maximum operating speed may be provided by the manufacturer of the second processor and may be a static value defined as a specification of the second processor. The maximum operating speed may be queried from the second processor through an API, or in another implementation, stored statically with the thermal map.

At 210, the first processor determines a processor performance metric. The first processor may determine the processor performance metric (PPM) utilizing the operating speed, the maximum operating speed, and the utilization rate and equation 1:

$$PPM = \frac{\text{operating speed}}{\text{maximum operating speed}} * \text{utilization rate} \quad \text{Equation 1}$$

At 212, the first processor retrieves a value from thermal map corresponding to the processor performance metric. The first processor utilizes the received temperature and the PPM as x, y cartesian coordinates to index into the thermal map. The indexing into the thermal map retrieves a value corresponding to the temperature and PPM.

At 214, the first processor determines if the value passes a threshold. The threshold may correspond to a value from the thermal map at which the PPM and temperature correlate to a critical point of the second processor. The threshold may be a historical metric of a set of predetermined processor metrics. The threshold may be user defined, or in another embodiment, determined as a set of predetermined processor metrics through benchmarking and trial to validate a degradation point of the second processor. The benchmarking and trial may be determined over a course of time to determine a historic performance of a processor. The threshold may be stored in the memory 106 with the thermal map, or in another implementation, separately along with the first processor.

At 216, the first processor presents an indication to a user. If the value passes the threshold, the first processor presents an indication to a user of the second processor. The indication may correspond to a user action item, including a recommendation for servicing the device. In another embodiment, the indication may include notifying the user that low priority processes executing on the second processor may be terminated. In another implementation, the first processor may execute an event, and terminate the low priority process utilizing a corresponding process identifier (PID). In another embodiment, the first processor may execute an event and lower the voltage supplied to the processor in an attempt to lower the operating temperature.

Figure 3:
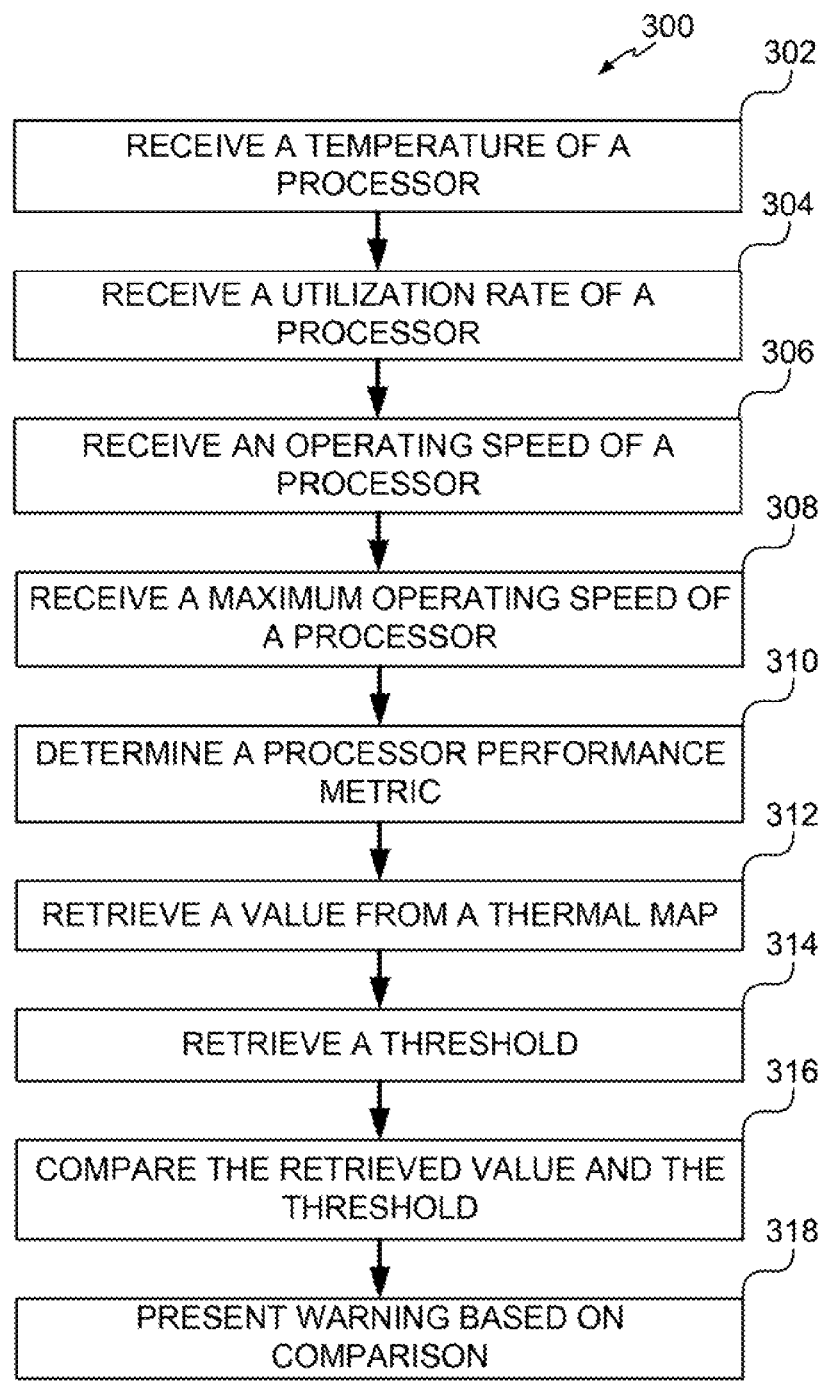
FIG. 3 is a flow diagram illustrating the processing of processor thermal metrics, according to an example.

FIG. 3 is a flow diagram illustrating the processing of processor thermal metrics, according to an example.

At 302, a first processor receives a temperature corresponding to an operating temperature of a processor. As described previously, the temperature may include a sampling from the temperature sensor reference in FIG. 1A. The temperature may be polled from the second processor 110, queried, or provided in an event driven notification system. At 304, a first processor receives a utilization rate corresponding to a utilization of the processor. In one implementation the utilization rate may be an average over a course of time. At 306, a first processor receives an operating speed of a processor. The operating speed may be received in a unit of megahertz or gigahertz.

At 308, a first processor receives a maximum operating speed of a processor. As described previously, the maximum operating speed corresponds to the maximum speed the processor can operate at under ideal conditions (temperature and load). The maximum operating speed may be provided by the manufacturer of the second processor and may be a static value defined as a specification of the second processor. The maximum operating speed may be queried from the second processor through an API, or in another implementation, stored statically with the thermal map.

At 310, a first processor determines a processor performance metric based at least in part on the utilization rate, the operating speed and the maximum operating speed. The PPM may be calculated utilizing equation 1.

At 312, the first processor retrieves a value from thermal map based on the processor performance metric and the temperature. As described previously the first processor utilizes the received temperature and the PPM as x, y cartesian coordinates to index into the thermal map. The indexing into the thermal map retrieves a value corresponding to the temperature and PPM.

At 314, the first processor retrieves a threshold, wherein the threshold corresponds to a predetermined processor performance metric and a predetermined temperature. The threshold may be determined based on the averaging of an aggregate of thermal mappings across a large-scale deployment. For example, an information technology team, may determine the threshold based on a determined point of failure for a processor, observed from temperature metrics collected over time. Additionally, the threshold may be determined based on an improper use of the second processor. For example, a user's job function may include computationally intensive tasks for which the second processor may not be designed. A threshold corresponding to a higher temperature and higher PPM may be indicative that the user may be mismatched to the second processor of their personal computer.

At 316, the first processor compares the retrieved value and the threshold. As described above, the retrieved value may be compared to the threshold. At 318 the first processor presents an indication to a user, responsive to the comparing, wherein the indication corresponds to a warning of diminished system performance based on the retrieved value. The first processor may notify the user of a potential mismatch of their hardware to their job task.

Figure 4:
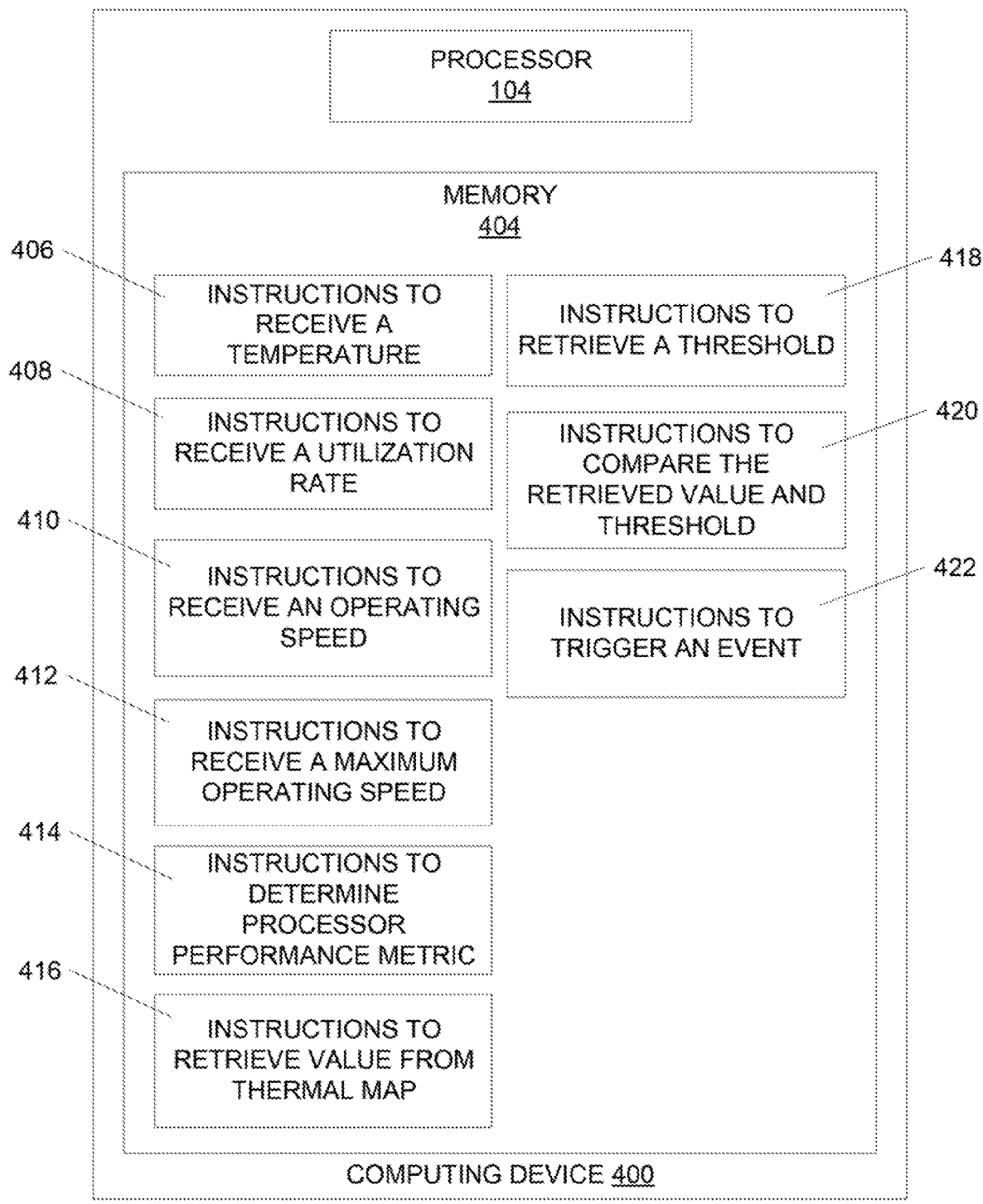
FIG. 4 is a computing device for supporting the processing of processor thermal metrics, according to an example.

FIG. 4 is a computing device for supporting the processing of processor thermal metrics, according to an example. The computing device 400 depicts a processor 104 and a memory device 404 and, as an example of the computing device 400 performing its operations, the memory device 404 may include instructions 406422 that are executable by the processor 104. The processor 104 may be synonymous with the processor found in common computing environments including but not limited to central processing units (CPUs). In another implementation the processor 104 may be an embedded microcontroller for processing inputs. The memory device 404 can be said to store program instructions that, when executed by processor 104, implement the components of the computing device 400. The executable program instructions stored in the memory device 404 include, as an example, instructions to receive a temperature corresponding to an operating temperature of a second processor 406, instructions to receive a utilization rate corresponding to a utilization of the second processor 408, instructions to receive an operating speed of the second processor 410, instructions receive a maximum operating speed of the second processor 412, instructions to determine a processor performance metric based at least in part on the utilization rate, the operating speed and the maximum operating speed 414, instructions to retrieve a value from thermal map based on the processor performance metric and the temperature 416, instructions to retrieve a threshold 418, instructions to compare the retrieved value to the threshold 420, and instructions to trigger an event based on the comparing and the retrieved value 422.

Memory device 404 represents generally any number of memory components capable of storing instructions that can be executed by processor 104. Memory device 404 is non-transitory in the sense that it does not encompass a transitory signal but instead is made up of at least one memory component configured to store the relevant instructions. As a result, the memory device 404 may be a non-transitory computer-readable storage medium. Memory device 404 may be implemented in a single device or distributed across devices. Likewise, processor 104 represents any number of processors capable of executing instructions stored by memory device 404. Processor 104 may be integrated in a single device or distributed across devices.

In one example, the program instructions 406-422 can be part of an installation package that, when installed, can be executed by processor 104 to implement the components of the computing device 400. In this case, memory device 404 may be a portable medium such as a CD, DVD, or flash drive, or a memory maintained by a server from which the installation package can be downloaded and installed. In another example, the program instructions may be part of an application or applications already installed. Here, memory device 404 may include integrated memory such as a flash ROM, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the example may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A system comprising:
   a temperature sensor; and
   a first processor, communicatively coupled to the temperature sensor, to:
   receive a temperature, from the temperature sensor, corresponding to an operating temperature of a second processor;
   receive a utilization rate corresponding to a utilization of the second processor;
   receive an operating speed of the second processor;
   receive a maximum operating speed of the second processor;
   determine a processor performance metric of the second processor based at least in part on the utilization rate, the operating speed, and the maximum operating speed of the second processor;
   retrieve a threshold temperature value from a thermal map corresponding to the processor performance metric of the second processor;
   compare the threshold temperature value at the processor performance metric of the second processor and the operating temperature at the processor performance metric of the second processor; and
   terminate a process running on the second processor when the operating temperature is above the threshold temperature value.

2. The system of claim 1, wherein the thermal map corresponds to a predetermined operating temperature specification.

3. The system of claim 1, wherein the first processor presents an indication to a user, warning of diminished system performance when the operating temperature is above the threshold temperature value.

4. The system of claim 1, wherein the first processor reduces a voltage supplied to the second processor when the operating temperature of the second processor is above the threshold temperature value.

5. A method comprising:
receiving, at a first processor via a temperature sensor arranged on a second processor, a temperature corresponding to an operating temperature of the second processor;
receiving, at the first processor, a utilization rate corresponding to a utilization of the second processor;
receiving, at the first processor, an operating speed of the second processor;
receiving, at the first processor, a maximum operating speed of the second processor;
determining, via the first processor, a processor performance metric of the second processor based at least in part on the utilization rate, the operating speed and the maximum operating speed of the second processor;
retrieving, via the first processor, a threshold temperature value from a thermal map corresponding to the processor performance metric of the second processor;
comparing, via the first processor, the threshold temperature value at the processor performance metric of the second processor and the operating temperature at the processor performance metric of the second processor; and
terminating a process running on the second processor, via the first processor, when the operating temperature of the second processor is above the threshold temperature value.

6. The method of claim 5, wherein the thermal map corresponds to a predetermined operating temperature specification.

7. The method of claim 5, further comprising:
reducing a voltage supplied to the second processor, via the first processor, when the operating temperature of the second processor is above the threshold temperature value.

8. The method of claim 5, wherein the threshold temperature value comprises a historical metric of a set of predetermined processor metrics.

9. A computing device comprising:
a memory having instructions stored thereon; and
a first processor to execute the instructions to:
receive an operating temperature of a second processor via a temperature sensor;
receive a utilization rate corresponding to a utilization of the second processor;
receive an operating speed of the second processor;
receive a maximum operating speed of the second processor;
determine a processor performance metric of the second processor based at least in part on the utilization rate, the operating speed and the maximum operating speed of the second processor;
retrieve a threshold temperature value from a thermal map corresponding to the processor performance metric of the second processor;
compare the threshold temperature value at the processor performance metric of the second processor and the operating temperature at the processor performance metric of the second processor; and
terminate a process running on the second processor when the operating temperature is above the threshold temperature value.

10. The computing device of claim 9, wherein the thermal map corresponds to a predetermined operating temperature specification.

11. The computing device of claim 9, wherein the first processor reduces a voltage supplied to the second processor when the operating temperature of the second processor is above the threshold temperature value.

12. The computing device of claim 9, wherein the threshold temperature value comprises a historical metric of a set of predetermined processor metrics.

* * * * *